United States Patent [19]

Cox

[11] Patent Number: 5,220,875
[45] Date of Patent: Jun. 22, 1993

[54] METHOD OF REDUCING SULFUR DIOXIDE CONTENT IN FLUE GASES

[75] Inventor: Norman D. Cox, Lansing, Ill.

[73] Assignee: American Oxycarb Corporation, Chicago, Ill.

[21] Appl. No.: 869,468

[22] Filed: Apr. 15, 1992

[51] Int. Cl.$^5$ .............................................. F23J 15/00
[52] U.S. Cl. ..................................... 110/345; 110/344; 422/168; 423/243.08; 431/4
[58] Field of Search ............... 110/343, 344, 345, 347; 423/243.08, 244.07; 431/3, 4; 422/168

[56] References Cited

U.S. PATENT DOCUMENTS

| | | | |
|---|---|---|---|
| 2,930,751 | 3/1960 | Holland | 208/287 |
| 4,440,100 | 4/1984 | Michelfelder et al. | 110/345 X |
| 4,533,532 | 8/1985 | Gebhard et al. | 423/243 X |
| 4,555,996 | 12/1985 | Torbov et al. | 110/345 |
| 4,960,577 | 10/1990 | Torbov et al. | 110/345 X |
| 5,027,723 | 7/1991 | Landreth et al. | 110/343 |
| 5,048,431 | 9/1991 | Landreth et al. | 110/343 |

*Primary Examiner*—Edward G. Favors
*Attorney, Agent, or Firm*—Marshall, O'Toole, Gerstein, Murray & Borun

[57] ABSTRACT

An improved method of reducing the amount of sulfur dioxide in combustion gases generated by the combustion of a sulfur-containing fuel in a combustion chamber. The improved method comprises introducing a sorbent composition capable of interacting with sulfur dioxide into a zone of the combustion chamber above the fuel and flame area, such that the sorbent composition is distributed throughout the combustion gases and interacts with sulfur dioxide to remove sulfur dioxide from the combustion gases in the form of a solid inorganic sulfate. The sorbent composition introduced into the combustion chamber comprises: (a) 100 parts by weight of a sorbent; and (b) about 0.25 parts to about 60 parts by weight of an enhancer, said enhancer comprising: (i) about 15% to about 75%, by weight of the enhancer, of a hydrated inorganic salt; (ii) about 25% to about 85%, by weight of the enhancer, of a clay; and (iii) 0% to about 10%, by weight of the enhancer, of a combustible liquid.

20 Claims, 1 Drawing Sheet

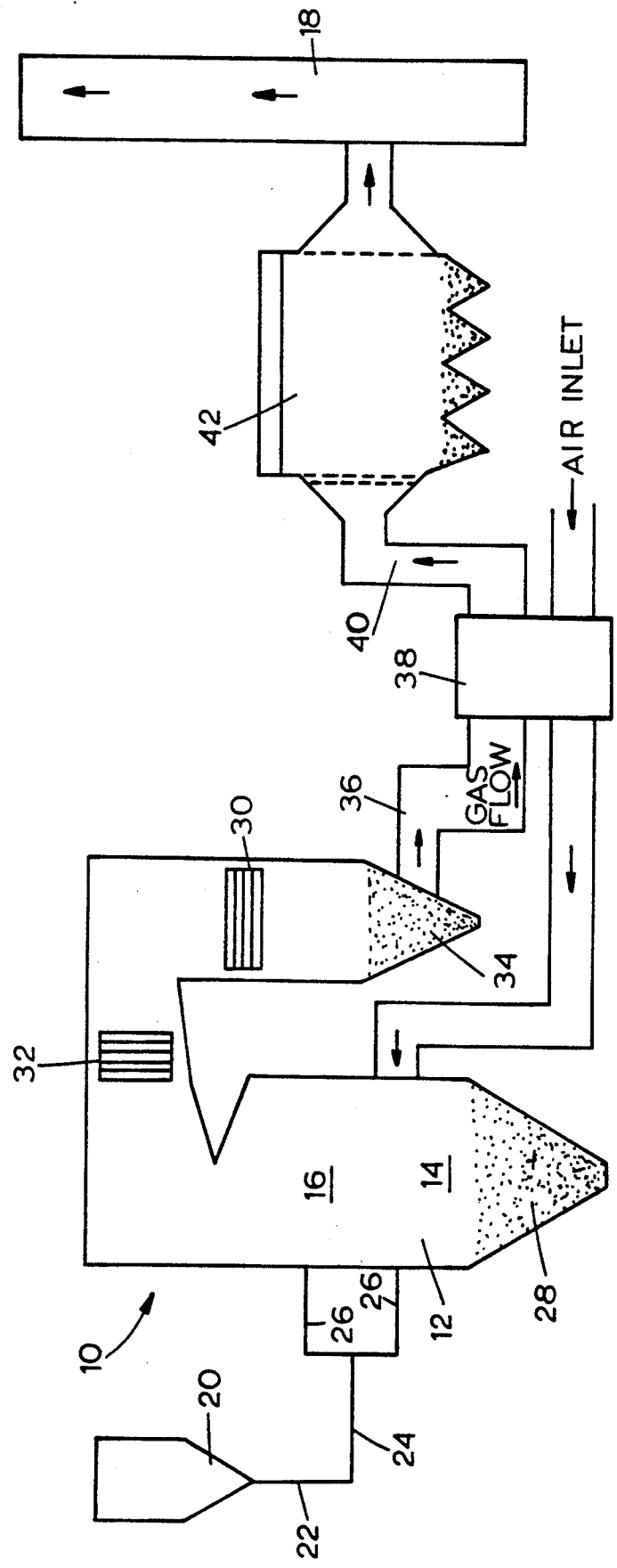

METHOD OF REDUCING SULFUR DIOXIDE CONTENT IN FLUE GASES

FIELD OF THE INVENTION

The present invention is directed to an improved method of reducing the amount of sulfur dioxide in combustion gases generated by the combustion of a sulfur-containing fuel in a combustion chamber. In particular, the present invention is directed to an improved method whereby a sorbent composition, comprising: (a) a sorbent capable of interacting with sulfur dioxide and (b) an enhancer, is introduced into the combustion chamber at a combustion zone above the fuel and flame area to contact and interact with the combustion gases, and remove sulfur dioxide from the combustion gases as a solid inorganic sulfate.

BACKGROUND OF THE INVENTION

Sulfur-containing fuels, such as coal, coke, oven gas and fuel oil, typically are used to fire boilers for producing steam to generate electricity, for heating purposes or for processing purposes. The fuel is combined with air, in excess of the stoichiometric amount required for combustion, and ignited at a series of burners in an enclosed combustion chamber to generate combustion products consisting primarily of hot gases, but also containing particulates, such as fly ash. Heat is extracted from the hot gases in a conventional manner, and is used, for example, to heat water and produce steam. The hot gases flow in a downstream direction from the boiler, and eventually are exhausted to the atmosphere through a stack. After completion of the steam-producing function, residual heat remaining in the hot combustion gases can be used to preheat combustion air.

The hot gases from the combustion reaction include both solid and gaseous pollutants. Solid particulate pollutants usually are removed in an electrostatic precipitator or a bag house, or a combination thereof. Gaseous pollutants generally include the oxides of nitrogen ($NO_x$) and sulfur dioxide ($SO_2$). Relatively recently, the oxides of nitrogen in the combustion gases have been reduced by improved combustion techniques for oil and gas-fired boilers, and by improvements in burner design for coal-fired boilers. However, the sulfur dioxide content of the combustion gases has remained unacceptably high.

A presence of sulfur dioxide in combustion gases is especially undesirable because, sulfur dioxide escaping into the atmosphere is a source of air pollution and acid rain. Accordingly, public utilities and other large consumers of fuel, and especially fossil fuels like coal, have been forced to use a low sulfur fuel and to sufficiently remove the sulfur dioxide from the combustion gases in order to comply with government-imposed emissions standards.

The need to reduce the amount of sulfur dioxide in combustion gases poses an economic challenge to large consumers of fossil fuels. The large fuel consumers not only must use the more expensive low sulfur fossil fuels, but also must expend large sums of capital for equipment, such as scrubbers, to remove sulfur dioxide from the combustion gases. The large fuel consumers also are facing further capital expenditures as government regulators continue to reduce the legal limit of sulfur dioxide that can be introduced into the atmosphere.

Accordingly, investigators have continually sought improved methods and apparatus to effectively reduce the amount of sulfur dioxide in combustion gases emitted into the atmosphere. Such improved methods and apparatus would allow a fossil fuel consumer to meet increasingly strict government-imposed emission standards, and if sufficiently effacious, also would allow the consumer to use the less expensive high sulfur fossil fuels.

One method of reducing the amount of sulfur dioxide in combustion gases, i.e., flue gases, is known as the dry sorbent injection method. A sorbent is a compound capable of interacting with sulfur dioxide in the flue gases, in the presence of oxygen, to produce a comparatively harmless solid compound that can be separated from the flue gases and removed from the combustion chamber with conventional particulate removal apparatus. Examples of sorbents previously employed in the dry sorbent injection method to remove sulfur dioxide from flue gases include the carbonates or the hydroxides of calcium, such as particles of limestone, i.e., calcium carbonate.

In a dry sorbent injection method utilizing limestone, the sulfur dioxide in the flue gases is converted to calcium sulfate, an innocuous solid compound that can be used as a construction material or that can be buried in a land fill without adversely effecting the environment. Initially, after introduction into the combustion chamber, the particles of limestone ($CaCO_3$) are calcined into lime ($CaO$) by the heat from the combustion reaction. The lime then reacts with sulfur dioxide, in the presence of oxygen (from the excess air in the combustion chamber), to produce calcium sulfate ($CaSO_4$).

Others have attempted, at least on a test basis, to inject limestone particles into a combustion chamber having burners that produce a low percentage of oxides of nitrogen, i.e., low $NO_x$ burners. In these attempts, limestone was introduced into the combustion chamber either through the fuel nozzles, through the inlets for introducing the secondary air (located closely adjacent the fuel nozzle), through tertiary air inlets closely surrounding the inlets for the secondary air, or through separate limestone-injecting inlets spaced relatively far downstream from the inlets for the fuel and the combustion air. In the first three instances, the limestone was premixed with the fuel and/or the combustion air entering the combustion chamber at the secondary and tertiary air inlets.

Each of these limestone injection techniques possessed disadvantages. Injection either through the fuel nozzles, or through secondary air inlets immediately adjacent the fuel nozzle, or through tertiary air inlets closely surrounding the secondary air inlets subjects the limestone particles to relatively high temperatures for relatively long periods of time. This can sinter the resulting lime particles, thereby reducing the surface area of the particles and their ability to interact with sulfur dioxide, and in turn decrease sulfur dioxide removal. Introducing the limestone particles relatively far downstream from the fuel nozzles and combustion air inlets decreases sulfur dioxide removal because the temperature at the point of introduction is too low and/or decreases too rapidly to efficiently calcine the limestone to lime. Introducing lime directly into the combustion chamber does not effectively reduce the amount of sulfur dioxide in flue gases.

Premixing the limestone particles with the combustion air also causes erosion and pluggage problems in the conduits that transport combustion air, and substantially reduces the ability to divide the limestone particles into substreams for introduction into the combustion chamber by a plurality of individual air outlets. These problems arise from the high velocity at which the combustion air flows through the transporting conduits, e.g., about 2,500 to about 5,000 ft/min. (about 762 to about 1524 m/min.), and the fact that the limestone particles are carried in dilute phase transport, i.e., a high air to limestone particle ratio.

If the velocity of the transporting combustion air is reduced to decrease the erosion and pluggage problems, the volume of the transporting air has to be increased in order to carry the limestone in dilute phase transport at the slower speeds. This can result in more combustion air at a given outlet, or series of outlets, than desired from the standpoint of efficient combustion or other considerations. Moreover, lowering the velocity at which the combustion air is introduced into the combustion chamber reduces the turbulence and mixing action provided by the combustion air, and such a reduction in turbulence is undesirable. A minimum combustion air velocity is necessary for the combustion air to properly distribute the limestone particles carried by the combustion air within the combustion chamber.

The dry sorbent injection method and attendant apparatus for reducing the amount of sulfur dioxide in a combustion gas are fully described in Landreth et al. U.S. Pat. Nos. 5,027,723 and 5,048,431, hereby incorporated by reference. In general, the dry sorbent injection method, as described above, includes introducing a solid sorbent into a combustion chamber, such as a boiler, in a zone of the combustion chamber above the fuel and flame area. This zone is of a sufficient temperature to calcine the solid sorbent, and allow the calcined sorbent to interact with sulfur dioxide present in the combustion gases and form a solid inorganic sulfate. For example, a sorbent, like hydrated lime (i.e., Ca(OH)$_2$) is introduced into a boiler at a zone above the fuel and flame area, wherein the hydrated lime is calcined to lime (i.e., CaO). In the presence of oxygen, the lime then interacts with sulfur dioxide to form calcium sulfate. The solid calcium sulfate separates from the flue gases and is collected and removed from the boiler by standard methods of removing ash from a boiler.

Under optimum conditions, the dry sorbent injection method disclosed by Landreth et al. reduces the amount of sulfur dioxide in combustion gases by approximately 50%. At this rate, the amount of sulfur dioxide is reduced to a sufficient extent to meet present-day emissions standards, even if a fossil fuel containing a medium amount of sulfur, e.g., about 3% by weight, is consumed. However, current emissions standards would not be met if a high sulfur fossil fuel is consumed, and a fuel consumer would not meet the more strict emissions standards scheduled to go into effect in 1995 and 2000, even if a low sulfur fossil fuel was used.

Therefore, it would be desirable to provide a method of reducing the amount of sulfur dioxide in combustion gases generated in a combustion chamber that burns fossil fuel such that: (a) stringent emissions standards can be met without the need for additional capital expenditures for sulfur dioxide-removal equipment and/or (b) medium or high sulfur-containing fuels can be used without violating present or future emissions standards. The present invention is directed to such an improved method, wherein improved sorbent composition is introduced into the combustion chamber using the dry sorbent injection method.

SUMMARY OF THE INVENTION

The present invention is directed to a method of reducing the amount of sulfur dioxide in combustion gases generated by the combustion of a sulfur-containing fuel, such as coal, in a combustion chamber. In particular, the sulfur dioxide concentration in a combustion gas is reduced using a dry sorbent injection method, wherein a sorbent composition is introduced into a zone of a combustion chamber above the flame and fuel area. The sorbent composition introduced into the combustion chamber is a solid, particulate composition comprising: (a) a sorbent capable of interacting with sulfur dioxide in the presence of oxygen, and (b) an enhancer that improves the ability of the sorbent to interact with sulfur dioxide. The enhancer comprises: (i) about 15% to about 75%, by weight of the enhancer, of a hydrated inorganic salt; (ii) about 25% to about 85%, by weight of the enhancer, of a clay; and (iii) 0% to about 10%, by weight of the enhancer, of a combustible liquid.

More particularly, the sorbent composition introduced into the combustion chamber, after calcining within the combustion chamber, interacts with sulfur dioxide, in the presence of oxygen, to convert the gaseous sulfur dioxide, into a solid sulfur-containing compound, i.e., an inorganic sulfate. The solid inorganic sulfate precipitates from the remaining combustion gases, then is removed from the combustion chamber by standard procedures.

The method of the present invention, utilizing a sorbent composition comprising a sorbent and an enhancer, increases the amount of sulfur dioxide removed from the combustion gases generated by a sulfur-containing fuel. In particular, the enhancer, when present in the sorbent composition in an amount of about 0.25 parts to about 60 parts by weight per 100 parts by weight of the sorbent, unexpectedly and surprisingly improves the ability of the sorbent to interact with, and remove, sulfur dioxide from the combustion gases of a fossil fuel.

In accordance with an important aspect of the present invention, the sorbent composition is used in a dry sorbent injection method by introducing the sorbent composition into the combustion chamber as a dense, particulate solid, i.e., is introduced with a minimum amount of air or other gaseous compounds. The sorbent composition is introduced into the combustion chamber under pressure, then is dispersed in the combustion chamber by the combustion products of the fuel. As will be demonstrated more fully hereinafter, the sorbent composition contacts and reacts with sulfur dioxide present in the combustion gases to remove up to about 80% by weight of the sulfur dioxide present in the combustion gases.

In accordance with another important aspect of the present invention, the sorbent composition is introduced into the combustion chamber at a zone above the fuel and the flame area. This zone of the combustion chamber has a temperature sufficient to calcine the sorbent. The particular zone wherein the sorbent composition is introduced is determined: (a) by the temperature necessary to calcine the sorbent, e.g., about 1500° F. to about 2400° F. for calcium-based sorbents and about 300° F. to about 500° F. for sodium-based sorbents; and (b) by the particular design of the combustion chamber which dictates the ease of removing the resulting inorganic sulfate from the combustion chamber. It should be noted that in the combustion chamber, the temperature of the combustion chamber and the combustion gases therein decrease in a downstream direction after the last burner. At any location along the downstream path, the temperature across the lateral dimensions of the combustion zone can vary. However, at any such location, an average temperature exists, and the average temperature is the temperature reference used herein, unless otherwise indicated.

In accordance with another important aspect of the present invention, the sorbent composition introduced into the combustion chamber comprises a sorbent and an enhancer. The enhancer increases the ability of the calcined sorbent to interact with sulfur dioxide in the combustion gases such that up to a 60% improvement in sulfur dioxide removal can be demonstrated by the present dry sorbent injection method (utilizing a sorbent composition including a sorbent and an enhancer) compared to a dry sorbent injection method utilizing only a sorbent.

The enhancer is present in the sorbent composition in an amount of about 0.25 parts to about 60 parts by weight for each 100 parts by weight of sorbent. The enhancer comprises a hydrated inorganic salt having the formula $M_xY_z.aH_2O$, wherein M is an alkali metal ion, an alkaline earth metal ion, or a combination thereof, Y is a noncorrosive anion, x and z are, independently, numerals in the range of 1 to 3, and a is a numeral in the range of 1 to about 24; a clay; and, optionally, a combustible liquid. The hydrated inorganic salt and the combustible liquid help disperse the sorbent composition throughout the combustion gases and help reduce the particle size of the sorbent to provide a more intimate contact between the sorbent and the sulfur dioxide in the combustion gases. Therefore, the interaction between the sorbent and sulfur dioxide is facilitated, and sulfur dioxide removal from the combustion gases is improved.

Other features and advantages are inherent in the method claimed and disclosed, and will become apparent to those skilled in the art from the following detailed description in conjunction with the accompanying drawing.

BRIEF DESCRIPTION OF THE DRAWINGS

FIG. 1 is a schematic of the method of the present invention.

DETAILED DESCRIPTION OF THE PREFERRED EMBODIMENTS

The present invention is directed to a method of reducing the amount of sulfur dioxide in combustion gases generated by the combustion of a sulfur-containing fuel in a combustion chamber. The present method is an improvement over the dry sorbent injection method disclosed by Landreth et al. in U.S. Pat. Nos. 5,027,723 and 5,048,431, incorporated herein by reference. Landreth et al. disclose a dry sorbent injection method that utilized limestone ($CaCO_3$) injected into a zone of the combustion chamber above the fuel and flame area. The method disclosed by Landreth et al. reduced the amount of sulfur dioxide in a combustion gas exhausted from a boiler to about 400 to about 500 parts per million (ppm).

In accordance with an important feature of the present invention, the improved method utilizes the basic method and apparatus disclosed by Landreth et al., but also utilizes an improved sorbent composition that increases the amount of sulfur dioxide removed from combustion gases by up to about 60%. In particular, the present method utilizes a sorbent composition comprising a sorbent and an enhancer that, when utilized in a method and apparatus such as that described by Landreth et al., can reduce the amount of sulfur dioxide in the flue gas exhausted from a stack of a boiler to about 150 to about 250 ppm.

In particular, the sorbent composition utilized in the present method includes a sorbent. The sorbent is a compound that, after calcining at a sufficiently elevated temperature, is capable of interacting with sulfur dioxide in the combustion gases, in the presence of oxygen, to form a solid inorganic sulfate. Exemplary sorbents include, but are not limited to, limestone (calcium carbonate), hydrated lime, (calcium hydroxide) dolomite ($CaMg(CO_3)_2$), sodium carbonate, sodium bicarbonate, potassium carbonate, potassium bicarbonate and combinations thereof.

In accordance with the present method, the sorbent, such as limestone, is introduced into the combustion chamber at a zone above the flame and fuel area having a temperature sufficient to calcine the sorbent. For calcium-based sorbents, the sorbent is introduced into a zone of the combustion chamber having a temperature of about 1500° F. to about 2400° F.; for sodium-based and potassium-based sorbents, the sorbent is introduced into a zone of the combustion chamber having a temperature of about 300° F. to about 500° F.

The conversion of sulfur dioxide to an inorganic sulfate is affected by the reactivity of the sorbent particles. The reactivity of the sorbent increases as the surface area of the sorbent increases. Therefore, the sorbent is included in the sorbent composition in the form of particles. A sufficient surface area is provided by utilizing sorbent particles having a diameter of about 150 microns or less. Preferably, the sorbent particles have a particle size in the range between about 5 microns and about 100 microns.

If increased reactivity is desired for a particular sorbent, reactivity can be increased by reducing the particle size of the sorbent. Reducing the particle size increases the surface area of the sorbent and results in a better distribution of the particles, but typically it also increases the cost of the sorbent. As will be explained more fully hereinafter, the enhancer utilized in the present method efficiently and economically helps reduce sorbent particle size to improve the removal of sulfur dioxide from combustion gases.

In general, a sorbent, like limestone, is introduced into the combustion chamber as finely-divided particles, and is calcined essentially immediately after the sorbent is introduced into the combustion chamber to form a calcined sorbent, like lime. The calcined sorbent then reacts, in the presence of oxygen, with the sulfur dioxide present in the combustion gases, and a solid inorganic sulfate is formed. It should be noted that directly introducing a calcined sorbent into the combustion chamber does not result in a significant reduction of sulfur dioxide from the combustion gases. The sodium-based and potassium-based sorbents function in an identical manner as the calcium-based sorbents. However, the sodium-based and potassium-based sorbents are calcined at a lower temperature than the calcium-based sorbents, and therefore are introduced into the combustion chamber at a zone further downstream from the zone wherein the calcium-based sorbent is introduced into the combustion chamber.

The above-described sorbents have been used previously to reduce the amount of sulfur dioxide in combustion gases. However, until the present invention, a neat sorbent has been introduced into the combustion chamber, as set forth in Landreth et al. U.S. Pat. Nos. 5,027,723 and 5,048,431. In accordance with the present invention, the sorbent is admixed with an enhancer to form a sorbent composition that is introduced into the combustion chamber at a zone above the fuel and flame area.

In particular, the sorbent composition includes 100 parts by weight of a sorbent and about 0.25 parts to about 60 parts by weight of an enhancer. Preferably, the enhancer is present in the sorbent composition in an amount of about 0.5 parts to about 25 parts by weight per 100 parts by weight of the sorbent. To achieve the full advantage of the present invention, the enhancer is present in the sorbent composition in an amount of about 1 part to about 5 parts by weight per 100 parts by weight of the sorbent.

If the enhancer is present below about 0.25 parts by weight of enhancer per 100 parts by weight of sorbent, an improved ability to remove sulfur dioxide from combustion gases is not observed. If the enhancer is present above about 60 parts by weight of enhancer per 100 parts by weight of sorbent, further improvements in removing sulfur dioxide from the combustion gases are not observed, and adverse results, such as increased particulates, fouling, and reduced precipitator efficiency, may be observed.

As will be demonstrated more fully hereinafter, if a sufficient amount of a calcium-based sorbent is introduced into the combustion chamber to provide a 3 to 1 mole ratio of elemental calcium to sulfur dioxide, about 50% of the sulfur dioxide present in the combustion gases is removed. Surprisingly and unexpectedly, if a sorbent composition including from about 0.25 parts to about 60 parts, and especially from about 1 part to about 5 parts, by weight of an enhancer to 100 parts of a calcium-based sorbent is introduced into the combustion chamber to provide a 3 to 1 mole ratio of elemental calcium to sulfur dioxide, then about 80% of the sulfur dioxide present in the combustion gases is removed. Accordingly, admixing an enhancer with the sorbent in a dry sorbent injection method to remove sulfur dioxide from combustion gases can improve sulfur dioxide removal by about 60%. Similar results are envisioned utilizing a sorbent composition comprising a sodium-based or potassium-based sorbent and an enhancer.

The enhancer comprises: (i) about 15% to about 75%, by weight of the enhancer, of a hydrated inorganic salt having the formula $M_xY_z.aH_2O$, wherein M is an alkali metal ion, an alkaline earth metal ion or a combination thereof; Y is a noncorrosive anion; x and z are, independently, numerals in the range of 1 to 3; and a is a numeral in the range of 1 to about 24; (ii) about 25% to about 85%, by weight of the enhancer, of a clay; and (iii) 0% to about 10%, by weight of the enhancer, of a combustible liquid. The enhancer utilized in the present method is similar to a composition described in Holland U.S. Pat. No. 2,930,751, incorporated herein by reference. Holland utilized the composition disclosed in U.S. Pat. No. 2,930,751 as a filter to remove impurities from liquid fuels, and thereby improve the combustion properties of the fuel.

In accordance with an important feature of the present invention, the enhancer includes a hydrated inorganic salt, i.e., an inorganic salt having at least one water of hydration. The particles of the hydrated inorganic salt are intimately admixed with the sorbent particles prior to introducing the sorbent composition into the combustion chamber. It has been theorized, but not relied upon herein, that after introduction into the combustion chamber, the water of hydration flash vaporizes from the hydrated inorganic salt to break the hydrated inorganic salt particles into smaller particles. The flash vaporization and resulting size reduction of the hydrated inorganic salt particles help disperse the sorbent throughout the combustion chamber, help prevent sintering of the sorbent which would reduce the sulfur dioxide-removal effectiveness of the sorbent, and help reduce the particle size of the sorbent thereby providing a greater sorbent surface area for a more efficient interaction with sulfur dioxide present in combustion gases.

In general, the hydrated inorganic salt is a compound having the general formula $M_xY_z.aH_2O$, wherein M is an alkali metal ion, an alkaline earth metal ion, or a combination thereof; Y is a noncorrosive anion; x and z are, independently, numerals in the range of 1 to 3; and a is a numeral in the range of 1 to about 24, and especially a numeral in the range of about 5 to about 15. Exemplary hydrated inorganic compounds include, but are not limited to, trisodium phosphate dodecahydrate, sodium metasilicate pentahydrate, sodium sesquicarbonate (dihydrate), sodium sesquisilicate hydrate, sodium orthosilicate pentahydrate, sodium tripolyphosphate hexahydrate, sodium tetraborate decahydrate, sodium tetraborate pentahydrate, sodium carbonate decahydrate, sodium carbonate heptahydrate, sodium carbonate monohydrate, sodium magnesium sulfate (tetrahydrate), sodium trimetaphosphate hexahydrate, sodium pyrophosphate (decahydrate), sodium sulfate decahydrate, sodium sulfate heptahydrate, potassium pentaborate (tetrahydrate), potassium tetraborate (octahydrate), potassium magnesium sulfate (tetrahydrate and hexahydrate), potassium pyrophosphate (trihydrate), lithium metaborate (octahydrate), lithium pentaborate (octahydrate), calcium carbonate hexahydrate, calcium nitrate tetrahydrate, calcium pyrophosphate pentahydrate, magnesium carbonate pentahydrate, magnesium carbonate trihydrate, magnesium nitrate hexahydrate, magnesium orthophosphate (including twenty-two water molecules of hydration), magnesium sulfate heptahydrate, magnesium sulfate monohydrate and similar hydrated inorganic compounds and combinations thereof. Hydrated inorganic halide compounds are not useful in the method of the present invention because a halide ion, like chloride, is corrosive within the combustion chamber.

In accordance with an important feature of the present invention, the hydrated inorganic salt includes at least one water molecule of hydration. As will be demonstrated in greater detail hereinafter, utilizing an enhancer including trisodium phosphate dodecahydrate increased sulfur dioxide removal from combustion gases by about 60%, when the enhancer was used with a sorbent. However, utilizing a sorbent and an enhancer including anhydrous trisodium phosphate in the dry sorbent injection method failed to appreciably improve the ability of the sorbent to remove sulfur dioxide from combustion gases.

In accordance with another important feature of the present invention, the hydrated inorganic salt should not be subjected to process steps, such as milling or pulverizing, during admixture with the other ingredients to form the enhancer, or during admixture between the enhancer and the sorbent, that drive the water of hydration from the hydrated inorganic salt. Such process steps adversely affect the ability of the enhancer to assist the sorbent in removing sulfur dioxide from combustion gases.

The hydrated inorganic salt is present in the enhancer in a sufficient amount to provide sufficient water of hydration to vaporize and perform its theorized function. Therefore, the hydrated inorganic salt is present in the enhancer in an amount of at least about 15% by weight of the enhancer. Increased amounts of the hydrated inorganic salt in the enhancer do not adversely affect the enhancer or the sorbent in removing sulfur dioxide from combustion gases. However, further improvements in sulfur dioxide removal are not observed at very high concentrations of the hydrated inorganic salt in the enhancer. Therefore, the amount of hydrated inorganic salt in excess of about 75% by weight of the enhancer is wasted. Preferably, the hydrated inorganic salt is present in the enhancer in an amount of about 15% to about 50%, and to achieve the full advantage of the present invention, from about 20% to about 35%, by weight of the enhancer.

In addition to the hydrated inorganic salt, the enhancer includes about 25% to about 85%, by weight of the enhancer, of a clay. Preferably, the enhancer includes about 30% to about 80%, by weight of the enhancer, of a clay. To achieve the full advantage of the present invention the enhancer includes about 40% to about 80%, by weight of the enhancer, of a clay. The clay primarily serves as a filler and to absorb or adsorb excess combustible liquid that is included in the enhancer. The clay also may absorb a portion of the sulfur dioxide present in the combustion gases. As will be explained more fully hereinafter, the hydrated inorganic salt is essentially impervious to the combustible liquid. Therefore, the clay absorbs and/or adsorbs any excess combustible liquid over the amount of combustible liquid needed to coat the surface of the hydrated inorganic salt.

The identity of the clay utilized in the enhancer is not particularly limited. Therefore, exemplary and nonlimiting clays such as bentonite, kaolinite, attapulgite, montmorillonite, beidellite, nontronite, hectorite, saponite, sepiolite, halloysite, vermiculite, illite, nacrite, leucite, sauconite and similar clays, and combinations thereof, are useful in the method of the present invention. Preferably, the clay included in the enhancer is bentonite.

In addition to the hydrated inorganic salt and the clay, the enhancer includes 0% to about 10%, by weight of the enhancer, of a combustible liquid. Preferably, the enhancer includes about 1% to about 8%, by weight of the enhancer, of a combustible liquid. To achieve the full advantage of the present invention, the enhancer includes about 2% to about 6%, by weight of the enhancer, of a combustible liquid.

The combustible liquid coats the hydrated inorganic compound to a point of saturation and the remainder of the combustible liquid, if any, is absorbed or adsorbed by the clay. It has been theorized, but not relied upon herein, that the combustible liquid acts in a manner analogous to the water of hydration of the hydrated inorganic salt. Specifically, the combustible liquid has a sufficiently low flash point such that when the sorbent composition is introduced into the combustion chamber, the temperature of the combustion chamber is sufficiently high to ignite the combustible liquid. It has been theorized, but not relied upon herein, that the ignition of the combustible liquid, combined with the flash evaporation of the water of hydration, break apart the particles of hydrated inorganic salt, and help disperse the sorbent throughout the combustion gases and help reduce the particle size of the sorbent. Accordingly, a more efficient interaction between the sorbent and the sulfur dioxide present in the combustion gases results.

The identity of the combustible liquid is not necessarily limited, as long as the combustible liquid has a sufficiently low flash point to ignite after the sorbent composition is introduced into the combustion chamber at a zone above the fuel and flame area. Accordingly, the combustible liquid has a flash point of at least about 100° F., and generally about 100° F. to about 300° F., as determined by the Tag Closed Cup (TCC) method. If the combustible liquid has a flash point below about 100° F., the combustible liquid may evaporate from the sorbent composition during storage. If the combustible liquid as a flash point above about 300° F., the flash point is too high for ignition when the sorbent composition is introduced into the combustion chamber relatively far downstream from the fuel and flame area of the combustion chamber, such as when a sodium-based or potassium-based sorbent is utilized. It should be understood however that if a calcium-based sorbent is utilized, the combustible liquid present in the enhancer can possess a flash point well above 300° F. because calcium-based sorbents are introduced into a zone of the combustion chamber above the fuel and flame area having a temperature of about 1500° F. to about 2400° F.

Therefore, exemplary combustible liquids include, but are not limited to, alcohols and petroleum distillates having a flash point of at least about 100° F. Petroleum distillates are the preferred combustible liquids because of economics and abundance of supply. Exemplary petroleum distillates include, but are not limited to, kerosene, No. 2 fuel oil, high flash naphtha, heavy aromatic solvent, naphthol spirits, mineral seal oil, mineral spirits, Stoddard solvent, odorless mineral spirits, VM&P naphtha and similar petroleum distillates, and combinations thereof. Exemplary and nonlimiting alcohols include 2 ethyl hexanol, iso-decyl alcohol, n-decyl alcohol, cyclohexanol, iso-hexyl alcohol, n-hexanol, methyl amyl alcohol, tridecyl alcohol and similar long chain alcohols, and combinations thereof. Other nonlimiting examples of suitable combustible liquids include ethylene glycol, propylene glycol, hexylene glycol, methyl amyl acetate, octyl acetate, diacetone alcohol, isophorone, glycol ethers, pine oil and related terpene hydrocarbons, and similar organic solvents, and combinations thereof.

The enhancer is prepared by simply admixing the hydrated inorganic salt, the clay and the combustible liquid using standard process steps, and under process conditions such that the hydrated inorganic salt retains its water of hydration. Preferably, the enhancer is prepared by first admixing the hydrated inorganic salt and the clay, then admixing the combustible liquid with the hydrated inorganic salt-clay mixture.

The following example illustrates an exemplary enhancer, prepared by first admixing the hydrated inorganic salt (trisodium phosphate dodecahydrate) and the clay (bentonite), following by admixing the combustible liquid (kerosene) with the hydrated inorganic salt-clay mixture.

EXAMPLE 1

|  | Weight | Weight % |
| --- | --- | --- |
| Bentonite | 375 pounds | 75.0 |
| Trisodium Phosphate Dodecahydrate | 104 pounds | 20.8 |
| Kerosene | 21 pounds | 4.2 |

The enhancer of Example 1 then is admixed with a sorbent, like limestone or sodium carbonate, in an amount of about 0.25 parts to about 60 parts by weight enhancer to 100 parts by weight of the sorbent, to provide a sorbent composition. Alternatively, correct portions of the enhancer and the sorbent can be admixed as the enhancer and sorbent are being introduced into the combustion chamber. Such an alternate method of preparation is useful as long as the enhancer and sorbent are sufficiently admixed to form the sorbent composition prior to introducing the sorbent composition into the combustion chamber.

The method of the present invention, utilizing the dry sorbent injection method and a sorbent composition comprising a sorbent and an enhancer, is illustrated in FIG. 1. Specifically, FIG. 1 is a schematic of a boiler that combusts fuel to heat air. In FIG. 1, a boiler 10 is vertically disposed. Boiler 10 includes a combustion zone generally indicated at 12 having a first combustion zone 14 and a second combustion zone 16. Fuel is consumed in the first combustion zone 14, and the second combustion zone 16 is the zone of boiler 10 above the fuel and flame area.

During operation, fuel consumed in the first combustion zone 14 produces combustion gases that pass to the second combustion zone 16. The combustion gases include sulfur dioxide. To reduce the amount of sulfur dioxide present in the combustion gases in the second combustion zone 16, and to ultimately reduce the amount of sulfur dioxide emitted into the atmosphere by a stack 18, a sorbent composition, such as a sorbent composition including limestone and the enhancer of Example 1, is introduced into the second combustion zone 16 from a storage hopper 20 which feeds to a conduct 22 extending downwardly from storage hopper 20 to line 24. The sorbent composition is introduced into the second combustion zone 16 via line 24 and inlet(s) 26. Preferably, storage hopper 20 is pressurized to facilitate introduction of the sorbent composition into boiler 10.

The sorbent composition comprises a sorbent and enhancer that have been intimately commingled before the sorbent composition is introduced into the second combustion zone 16 of boiler 10. The sorbent composition is introduced through inlet(s) 26 as a dense phase, i.e., utilizing a high ratio of sorbent composition to air to introduce the sorbent composition into boiler 10. Typically, the ratio of sorbent composition to air is about 90 to 1, with a minimum ratio of about 20 to 1 The use of a high sorbent composition to air ratio (i.e., introducing a low amount of air into the combustion chamber with the sorbent composition) helps maintain proper fuel combustion in boiler 10.

Because a high sorbent composition-to-air ratio is utilized, the sorbent composition is not introduced into the second combustion zone 16 with sufficient velocity to distribute the sorbent composition throughout the second combustion zone 16. Accordingly, the sorbent composition is dispersed throughout the second combustion zone 16 by the combined effects of turbulence of the combustion gases, flash vaporization of the water of hydration of the hydrated inorganic salt and ignition of the combustible liquid. The sorbent thereby becomes homogeneously dispersed throughout the second combustion zone 16, is calcined, and then interacts with sulfur dioxide in the combustion gases, in the presence of oxygen, to form a solid inorganic sulfate. The flash vaporization of the water of hydration from the hydrated inorganic salt and the ignition of the combustible liquid also help reduce the size of the sorbent particles, thereby facilitating the interaction between the sorbent and sulfur dioxide. Only a minimum amount of air, i.e., oxygen, is required for the formation of the inorganic sulfate to occur.

The amount of sorbent composition introduced into boiler 10 is determined by the amount of sulfur dioxide initially present in the combustion gases and by the final desired amount of sulfur dioxide to remain in the combustion gases. The amount of sulfur dioxide present in the combustion gases can be continuously monitored by standard techniques, and the amount of sorbent composition introduced into boiler 10 can be adjusted accordingly. Generally, increasing the ratio of sorbent composition to sulfur dioxide increases sulfur dioxide removal efficiency.

A portion of the solid inorganic sulfate falls into an ash collection area 28, and is removed from boiler 10 by standard procedures. The remainder of the inorganic sulfate remains in the combustion gases and flows downstream past a primary superheater 30 and a secondary superheater 32, if present, for superheating steam generated at boiler 10. The combustion, or flue, gases then flow through a particulate removing apparatus 34 (to remove more of the remaining inorganic sulfate and ash), a conduit 36, and a heat exchanger 38, which serves to preheat air introduced into boiler 10.

Finally, the combustion gases flow through a conduit 40 and an electrostatic precipitator 42 that removes any particulates, including the precipitated inorganic sulfate, remaining in the flue gases. The combustion, or flue, gases then are emitted into the atmosphere through stack 18. In accordance with the present invention, the emitted flue gases have a sulfur dioxide concentration of about 150 ppm to about 250 ppm. This concentration range is below present, and expected, emission standards for sulfur dioxide, and is a significant improvement over the 400 ppm to 500 ppm sulfur dioxide concentration achieved in prior dry sorbent injection methods.

The above-described method is an embodiment of the present invention wherein the sorbent composition includes a calcium-based sorbent. Such calcium-based sorbents are introduced into boiler 10 at a second combustion zone 16 having a temperature of about 1500° F. to about 2400° F. This temperature range is sufficiently high to first calcine the calcium-based sorbent to lime, and then to allow the lime, in the presence of oxygen, to interact with sulfur dioxide present in the combustion gases relatively rapidly. This temperature also is sufficiently low to preclude sintering of the calcium-based sorbent.

In an alternate embodiment of the present invention, a sodium-based or potassium-based sorbent is included in the sorbent composition. In accordance with this embodiment, the sodium-based or potassium-based sorbents are calcined at a temperature of about 300° F. to about 500° F., and therefore are not introduced into boiler 10 at the second combustion zone 16. In this embodiment, the apparatus utilized to introduce the sorbent composition into boiler 10, namely hopper 20, conduit 22, line 24 and inlet(s) 26, are positioned in conduit 40, after the heat exchanger 38 and prior to the electrostatic precipitator 42. In this zone, the combustion gases have a sufficiently low temperature for calcining the sodium-based or potassium-based sorbent, and a sufficiently high temperature to volatilize the water of hydration from the hydrated inorganic salt and to ignite the combustible liquid. The resulting inorganic sulfate that is precipitated is removed from the combustion chamber at an area near the bottom of conduit 40 by a standard apparatus (not shown) and by the electrostatic precipitator 42.

In accordance with another important feature of the present invention, sulfur dioxide removal from combustion gases is further improved by introducing a calcium-based sorbent composition into the second combustion zone 16 of boiler 10 and also by introducing a sodium-based or potassium-based sorbent composition into conduit 40. In such an embodiment, high sulfur-containing fuels can be consumed in boiler 10 without exceeding sulfur dioxide emission limits.

Obviously, many modifications and variations of the inventions as hereinbefore set forth can be made without departing from the spirit and scope thereof, and therefore, only such limitations should be imposed as are indicated by the appended claims.

I claim:

1. In a method of reducing the amount of sulfur dioxide in combustion gases generated by the combustion of a sulfur-containing fuel in a combustion chamber, including the steps of
    combusting the sulfur-containing fuel in the combustion chamber to generate combustion gases including sulfur dioxide;
    introducing a sorbent composition into the combustion chamber at a combustion zone above a fuel and flame area of the combustion chamber, said combustion zone having a sufficient temperature to calcine the sorbent composition; and
    calcining the sorbent composition in the combustion zone to allow interactions between the calcined sorbent composition and sulfur dioxide in the combustion gases to form a solid inorganic sulfate and decrease the amount of sulfur dioxide in the combustion gases;
    the improvement comprising introducing into the combustion chamber a sorbent composition comprising:
    (a) 100 parts by weight of a sorbent, and
    (b) about 0.25 parts to about 60 parts by weight of an enhancer, said enhancer comprising:
        (i) about 15% to about 75% by weight of a hydrated inorganic salt;
        (ii) about 25% to about 85% by weight of a clay; and
        (iii) 0% to about 10% by weight of a combustible liquid.

2. The method of claim 1 wherein the combustion zone above the fuel and flame area of the combustion chamber has a temperature of about 1500° F. to about 2400° F., and wherein the sorbent is a calcium-based sorbent.

3. The method of claim 2 wherein the calcium-based sorbent is selected from the group consisting of limestone, hydrated lime, dolomite, and combinations thereof.

4. The method of claim 1 wherein the combustion zone above the fuel and flame area of the combustion chamber has a temperature of about 300° F. to about 500° F., and wherein the sorbent is a sodium-based sorbent, a potassium-based sorbent, or a combination thereof.

5. The method of claim 4 wherein the sodium-based sorbent and potassium-based sorbent are selected from the group consisting of sodium carbonate, sodium bicarbonate, potassium carbonate, potassium bicarbonate, and combinations thereof.

6. The method of claim 1 wherein the sorbent composition includes about 0.5 parts to about 25 parts by weight of the enhancer to 100 parts by weight of the sorbent.

7. The method of claim 1 wherein the sorbent composition includes about 1 part to about 5 parts by weight of the enhancer per 100 parts by weight of the sorbent.

8. The method of claim 1 wherein the enhancer includes about 15% to about 50% by weight of the hydrated inorganic salt.

9. The method of claim 1 wherein the enhancer includes about 20% to about 35% by weight of the hydrated inorganic salt.

10. The method of claim 1 wherein the hydrated inorganic salt has the formula $M_xY_z \cdot aH_2O$, wherein M is an alkali metal ion, or an alkaline earth metal ion, or a combination thereof; Y is a noncorrosive anion; x and z are, independently, numerals in the range of 1 to 3; and a is a numeral in the range of 1 to about 24.

11. The method of claim 1 wherein the hydrated inorganic salt is selected from the group consisting of trisodium phosphate dodecahydrate, sodium metasilicate pentahydrate, sodium sesquicarbonate (dihydrate), sodium sesquisilicate hydrate, sodium orthosilicate pentahydrate, sodium tripolyphosphate hexahydrate, sodium tetraborate decahydrate, sodium tetraborate pentahydrate, sodium carbonate decahydrate, sodium carbonate heptahydrate, sodium carbonate monohydrate, sodium magnesium sulfate (tetrahydrate), sodium trimetaphosphate hexahydrate, sodium pyrophosphate (decahydrate), sodium sulfate decahydrate, sodium sulfate heptahydrate, potassium pentaborate (tetrahydrate), potassium tetraborate (octahydrate), potassium magnesium sulfate (tetrahydrate), potassium magnesium sulfate (hexahydrate), potassium pyrophosphate (trihydrate), lithium metaborate (octahydrate), lithium pentaborate (octahydrate), calcium carbonate hexahydrate, calcium nitrate tetrahydrate, calcium pyrophosphate pentahydrate, magnesium carbonate pentahydrate, magnesium carbonate trihydrate, magnesium nitrate hexahydrate, magnesium orthophosphate (including twenty-two water molecules of hydration), magnesium sulfate heptahydrate, magnesium sulfate monohydrate, and combinations thereof.

12. The method of claim 1 wherein the enhancer includes about 30% to about 80% by weight of the clay.

13. The method of claim 1 wherein the clay is selected from the group consisting of bentonite, kaolinite, attapulgite, montmorillonite, beidellite, nontronite, hectorite, saponite, sepiolite, halloysite, vermiculite, illite, nacrite, leucite, sauconite, and combinations thereof.

14. The method of claim 1 wherein the enhancer includes about 1% to about 8% by weight of the combustible liquid.

15. The method of claim 1 wherein the enhancer includes about 2% to about 6% by weight of the combustible liquid.

16. The method of claim 1 wherein the combustible liquid has a flash point of at least about 100° F.

17. The method of claim 1 wherein the combustible liquid is selected from the group consisting of kerosene, No. 2 fuel oil, high flash naphtha, heavy aromatic solvent, naphthol spirits, mineral seal oil, mineral spirits, Stoddard solvent, odorless mineral spirits, VM&P naphtha, 2-ethyl hexanol, iso-decyl alcohol, n-decyl alcohol, cyclohexanol, iso-hexyl alcohol, n-hexanol, methyl amyl alcohol, tridecyl alcohol, ethylene glycol, propylene glycol, hexylene glycol, methyl amyl acetate, octyl acetate, diacetone alcohol, isophorone, glycol ethers, pine oil, and combinations thereof.

18. The method of claim 1 wherein the enhancer includes about 15% to about 50% by weight trisodium phosphate dodecahydrate as the hydrated inorganic salt; about 30% to about 80% by weight bentonite as the clay; and about 1% to about 8% by weight kerosene as the combustible liquid; and wherein the sorbent is limestone, hydrated lime, or a combination thereof.

19. The method of claim 18 wherein the enhancer is present in an amount of about 1 part to about 5 parts by weight per 100 parts by weight of the sorbent.

20. The method of claim 1 wherein the sorbent composition is introduced into the combustion chamber in a ratio of sorbent composition to air of at least 20 to 1.

* * * * *